D. PALMER-JONES.
CLAMPING DEVICE FOR SCAFFOLDING OR THE LIKE TEMPORARY ERECTIONS.
APPLICATION FILED MAY 31, 1921.
1,437,266. Patented Nov. 28, 1922.
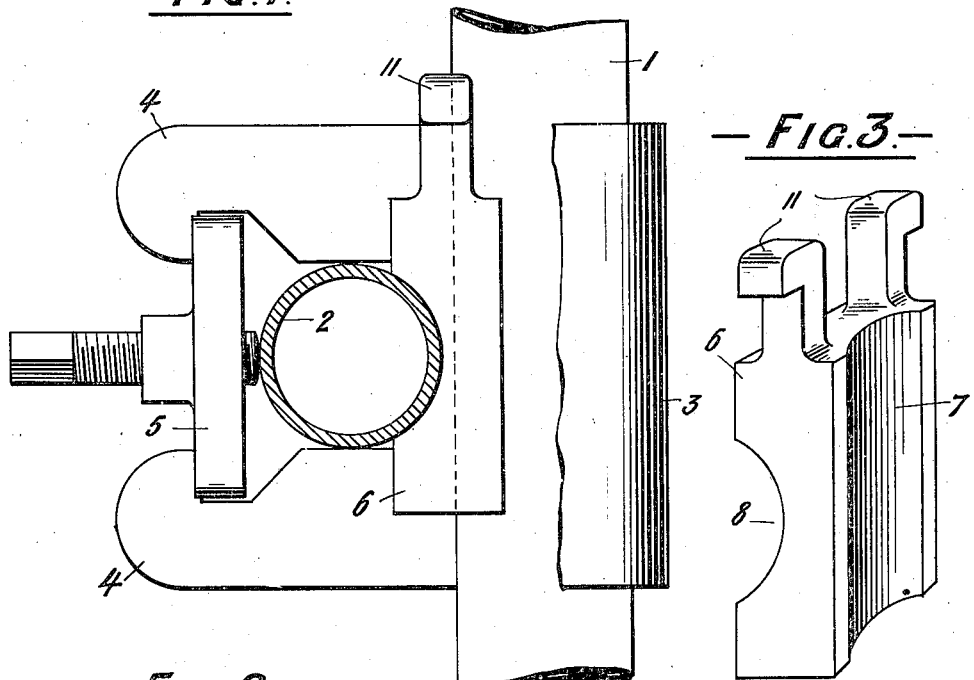
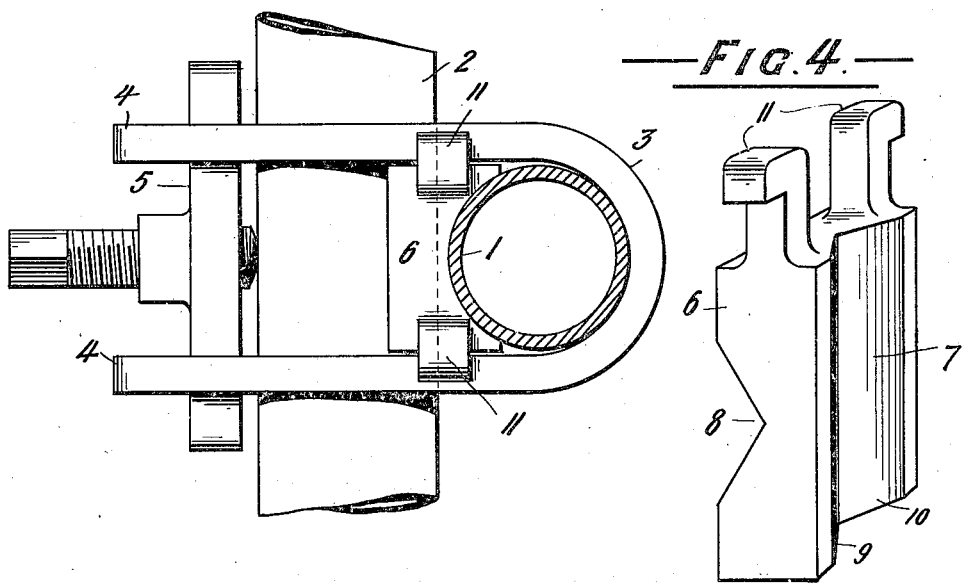

Patented Nov. 28, 1922.

1,437,266

UNITED STATES PATENT OFFICE.

DANIEL PALMER-JONES, OF LONDON, ENGLAND, ASSIGNOR TO THE TUBULAR SCAFFOLDING COMPANY, LIMITED, OF LONDON, ENGLAND.

CLAMPING DEVICE FOR SCAFFOLDING OR THE LIKE TEMPORARY ERECTIONS.

Application filed May 31, 1921. Serial No. 473,895.

*To all whom it may concern:*

Be it known that I, DANIEL PALMER-JONES, a subject of the King of Great Britain, residing at London, England, have invented certain new and useful Improvements in Clamping Devices for Scaffolding or the like Temporary Erections, of which the following is a specification.

The present invention relates to improvements in the construction of a clamping device for clamping a first cylindrical member at an angle to a second cylindrical member, and the device, the subject matter of this invention as hereafter described and claimed, is to be employed with clamping apparatus for scaffolds of a known type which consists of a U-shaped bracket to embrace the first cylindrical member, the ends of the arms of said U-shaped bracket carrying a clamping device to act on said second cylindrical scaffold member which is located between said clamping device and the first scaffold member, while between said first scaffold member and said second scaffold member there is placed a block or saddle, hereafter termed a coupler block, which has a groove on one face to fit the first scaffold member and a groove on the opposite face to fit the second scaffold member and which coupler block is constructed with improved means by which it is supported by the U-shaped bracket during the assemblage and clamping operations. Heretofore coupler blocks of this kind have been formed with flanges provided with holes through which it was necessary to thread the bolts or other fastening members of the clamping device.

Now the present invention particularly refers to the detailed construction of the coupler block whereby any threading of the coupler block onto members of the clamping device is obviated, it being only necessary to drop the coupler block into the arms of the clamping device and it will be supported properly therein during the assemblage and clamping operations, all as hereinafter described and claimed.

The invention will be described with reference to the accompanying drawings.

Fig. 1 is an elevation partly in section, and Fig. 2 is a plan view of the invention applied to a scaffold clamping apparatus of a type before mentioned.

Fig. 3 is a perspective view of the improved coupler block, detached, and Fig. 4 is a similar view showing a slight modification in structure.

Referring to Figs. 1, 2 and 3, 1 and 2 represent two tubular members which it is desired to connect at approximately right angles to one another by means of the clamping apparatus comprising the U-shaped bracket 3 having arms 4 co-operating with a clamping plate 5. Between the tubular members 1 and 2 is inserted a block or packing piece 6 which may be of metal or of any desired material, and the said block 6 has formed about centrally thereon a longitudinal groove 7 upon one face and a transverse groove 8 upon the opposite face. These grooves 7 and 8 are preferably formed with a curvature of the same radius as that of the surface of the member to which they are to be applied, and in this case the whole of the curved surface of the grooves will act as a bearing surface for the members. In the modification shown at Fig. 4, instead of forming the grooves with a curved surface as above described, the said grooves may be formed with two sides 9 and 10, meeting in a central angle, but in this case it will be noted the members will be in line contact with each side.

According to this invention, in the construction of the blocks or packing pieces 6 so far described, two upstanding hook-shaped lugs 11 are mounted or formed at the upper end thereof for the purpose of holding and positioning the block while the clamping apparatus is being placed in the required position and tightened to hold the two members 1 and 2 together.

To connect the two members 1 and 2 together as shown at Figs. 1 and 2, the U-shaped bracket 3 is placed astride the vertical member 1; the block 6 is then inserted between the arms 4 of the U-shaped bracket 3 with the vertical member 1 resting in the groove 7 therein, the hook-shaped lugs 11 of the block 6 bearing upon the upper surface of the arms 4 and supporting the said block 6 in the required position. The horizontal scaffold member 2 is then placed between the arms 4 of the U-shaped bracket so that it contacts and rests in the transverse groove 8 formed in the block 6, and the clamping plate 5 is then placed in position and the whole construction tightened by means of the clamping screw thereon.

What I claim as my invention and desire to secure by Letters Patent is:—

In a clamping device for clamping a first cylindrical scaffold member at an angle to a second cylindrical scaffold member; the combination with a U-shaped bracket to embrace the first vertical scaffold member, the two arms of said U-shaped bracket extending beyond said first scaffold member, a clamping device carried by the ends of said arms of said U-shaped bracket, and a clamping member carried by said clamping device to act upon said second scaffold member to force same towards said first scaffold member; of a coupler block located between said two scaffold members and between said arms of said U-shaped bracket, said block having a groove on one face to conform with and fit said first scaffold member and a groove on the opposite face to fit said second scaffold member, and lugs upstanding from the upper end of said coupler block, said lugs having upper lateral extensions extending beyond the vertical sides of said coupler block to engage with and rest upon the upper edges of said arms of said U-shaped bracket to support said coupler block during the assemblage and clamping operations.

In witness whereof I have hereunto set my hand in the presence of two witnesses.

DANIEL PALMER-JONES.

Witnesses:
THOMAS WILLIAM ROGERS,
WILLIAM A. MARSHALL.